United States Patent
Harris et al.

(10) Patent No.: US 8,543,503 B1
(45) Date of Patent: Sep. 24, 2013

(54) SYSTEMS AND METHODS FOR AUTOMATED INVOICE ENTRY

(75) Inventors: Scott Harris, San Francisco, CA (US); Joshua Lavinsky, Hoboken, NJ (US); Setty Sreeharsha Dasa Anjayaiah, Fremont, CA (US)

(73) Assignee: JPMorgan Chase Bank, N.A., New York, NY (US)

( * ) Notice: Subject to any disclaimer, the term of this patent is extended or adjusted under 35 U.S.C. 154(b) by 178 days.

(21) Appl. No.: 13/075,990

(22) Filed: Mar. 30, 2011

(51) Int. Cl.
*G06Q 40/00* (2012.01)
*G07F 19/00* (2006.01)

(52) U.S. Cl.
USPC .............................................. 705/40; 705/34

(58) Field of Classification Search
None
See application file for complete search history.

(56) References Cited

U.S. PATENT DOCUMENTS

| | | |
|---|---|---|
| 2,005,003 A | 6/1935 | Patton et al. |
| 3,653,480 A | 4/1972 | Yamamoto et al. |
| 3,938,090 A | 2/1976 | Borison et al. |
| 4,050,375 A | 9/1977 | Orleans |
| 4,141,078 A | 2/1979 | Bridges et al. |
| 4,205,780 A | 6/1980 | Burns |
| 4,264,808 A | 4/1981 | Ownes et al. |
| 4,321,672 A | 3/1982 | Braun et al. |
| 4,385,285 A | 5/1983 | Horst et al. |
| 4,396,985 A | 8/1983 | Ohara |
| 4,443,027 A | 4/1984 | McNeely et al. |
| 4,453,074 A | 6/1984 | Weinstein |
| 4,454,414 A | 6/1984 | Benton |
| RE31,692 E | 10/1984 | Tyburski et al. |
| 4,495,018 A | 1/1985 | Vohrer |
| 4,575,621 A | 3/1986 | Dreifus |
| 4,605,844 A | 8/1986 | Haggan |
| 4,614,861 A | 9/1986 | Pavlov et al. |
| 4,617,457 A | 10/1986 | Myers |
| 4,650,981 A | 3/1987 | Foletta |
| 4,672,377 A | 6/1987 | Murphy |
| 4,694,397 A | 9/1987 | Grant et al. |
| 4,697,072 A | 9/1987 | Kawana |
| 4,700,055 A | 10/1987 | Kashkashian |
| 4,701,601 A | 10/1987 | Francini et al. |
| 4,713,761 A | 12/1987 | Sharpe et al. |
| 4,752,877 A | 6/1988 | Roberts et al. |
| 4,797,913 A | 1/1989 | Kaplan |
| 4,799,156 A | 1/1989 | Shavit |
| 4,807,177 A | 2/1989 | Ward |
| 4,812,628 A | 3/1989 | Boston et al. |

(Continued)

FOREIGN PATENT DOCUMENTS

| | | |
|---|---|---|
| EP | 0421808 | 4/1991 |
| EP | 0665486 | 8/1995 |

(Continued)

OTHER PUBLICATIONS

Alabama Department of Revenue Selects Unisys for Imaging Solution to Speed Tax Returns, Bus. Wire, Sep. 6, 1995.

(Continued)

*Primary Examiner* — Fahd Obeid
(74) *Attorney, Agent, or Firm* — Lowenstein Sandler LLP

(57) ABSTRACT

The present invention is directed to methods and systems for the transfer of bulk paper invoices into electronic invoices for electronic submission from a seller to a buyer. The systems and methods described herein use matching logic to transfer details of the paper invoices into electronic invoices, thereby streamlining the process of bulk invoicing.

20 Claims, 4 Drawing Sheets

(56) References Cited

U.S. PATENT DOCUMENTS

| | | |
|---|---|---|
| 4,823,264 A | 4/1989 | Deming |
| 4,845,347 A | 7/1989 | McCrindle |
| 4,859,837 A | 8/1989 | Halpern |
| 4,893,333 A | 1/1990 | Baran et al. |
| 4,931,793 A | 6/1990 | Fuhrmann et al. |
| 4,939,674 A | 7/1990 | Price et al. |
| 4,948,174 A | 8/1990 | Thomson et al. |
| 4,974,878 A | 12/1990 | Josephson |
| 4,975,841 A | 12/1990 | Kehnemuyi et al. |
| 4,977,501 A | 12/1990 | Lefevre |
| 4,988,849 A | 1/1991 | Sasaki |
| 4,992,646 A | 2/1991 | Collin |
| 4,992,940 A | 2/1991 | Dworkin |
| 5,023,904 A | 6/1991 | Kaplan |
| 5,053,607 A | 10/1991 | Carlson |
| 5,054,096 A | 10/1991 | Beizer |
| 5,072,380 A | 12/1991 | Randelman et al. |
| 5,080,748 A | 1/1992 | Bonomi |
| 5,097,115 A | 3/1992 | Ogasawara |
| 5,111,395 A | 5/1992 | Smith |
| 5,121,945 A | 6/1992 | Thomson et al. |
| 5,122,950 A | 6/1992 | Mee |
| 5,136,502 A | 8/1992 | Van Remortel et al. |
| 5,175,682 A | 12/1992 | Higashiyama |
| 5,187,750 A | 2/1993 | Behera |
| 5,198,975 A | 3/1993 | Baker et al. |
| 5,224,034 A | 6/1993 | Katz et al. |
| 5,225,978 A | 7/1993 | Petersen |
| 5,237,159 A | 8/1993 | Stephens |
| 5,237,620 A | 8/1993 | Deaton et al. |
| 5,257,486 A | 11/1993 | Holmwall |
| 5,265,007 A | 11/1993 | Barnhard, Jr. et al. |
| 5,276,311 A | 1/1994 | Hennige |
| 5,283,829 A | 2/1994 | Anderson |
| 5,287,269 A | 2/1994 | Dorrough et al. |
| 5,311,594 A | 5/1994 | Penzias |
| 5,315,508 A | 5/1994 | Bain et al. |
| 5,321,238 A | 6/1994 | Watanabe |
| 5,326,959 A | 7/1994 | Perazza |
| 5,336,870 A | 8/1994 | Hughes |
| 5,349,170 A | 9/1994 | Kern |
| 5,350,906 A | 9/1994 | Brody et al. |
| 5,351,187 A | 9/1994 | Hassett |
| 5,352,877 A | 10/1994 | Morley |
| 5,367,581 A | 11/1994 | Van Horn |
| 5,373,550 A | 12/1994 | Campbell |
| 5,382,784 A | 1/1995 | Eberhardt |
| 5,396,417 A | 3/1995 | Burks et al. |
| 5,402,474 A | 3/1995 | Miller |
| 5,412,190 A | 5/1995 | Kopesec |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glasser et al. |
| 5,446,740 A | 8/1995 | Yien |
| 5,448,471 A | 9/1995 | Deaton et al. |
| 5,459,482 A | 10/1995 | Orlen |
| 5,465,206 A | 11/1995 | Hilt et al. |
| 5,477,040 A | 12/1995 | LaLonde |
| 5,479,494 A | 12/1995 | Clitherow |
| 5,483,445 A | 1/1996 | Pickering |
| 5,484,988 A | 1/1996 | Hills |
| 5,495,981 A | 3/1996 | Warther |
| 5,500,890 A | 3/1996 | Rogge et al. |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,532,464 A | 7/1996 | Josephson et al. |
| 5,532,689 A | 7/1996 | Bueno |
| 5,541,583 A | 7/1996 | Mandelbaum |
| 5,544,043 A | 8/1996 | Miki et al. |
| 5,544,046 A | 8/1996 | Niwa |
| 5,550,734 A | 8/1996 | Tarter |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,592,377 A | 1/1997 | Lipkin |
| 5,592,378 A | 1/1997 | Cameron |
| 5,599,528 A | 2/1997 | Igaki |
| 5,602,936 A | 2/1997 | Green et al. |
| 5,603,025 A | 2/1997 | Tabb |
| 5,615,109 A | 3/1997 | Eder |
| 5,617,474 A | 4/1997 | Ditzig et al. |
| 5,619,558 A | 4/1997 | Jheeta |
| 5,621,201 A | 4/1997 | Langhans |
| 5,621,812 A | 4/1997 | Deaton et al. |
| 5,638,457 A | 6/1997 | Deaton et al. |
| 5,640,577 A | 6/1997 | Scharmer |
| 5,642,419 A | 6/1997 | Rosen |
| 5,642,485 A | 6/1997 | Deaton et al. |
| 5,644,723 A | 7/1997 | Deaton et al. |
| 5,644,778 A | 7/1997 | Burks et al. |
| 5,649,114 A | 7/1997 | Deaton et al. |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,521 A | 10/1997 | Garrou |
| 5,677,955 A | 10/1997 | Doggett et al. |
| 5,679,938 A | 10/1997 | Templeton |
| 5,679,940 A | 10/1997 | Templeton |
| 5,680,459 A | 10/1997 | Hook et al. |
| 5,687,250 A | 11/1997 | Curley et al. |
| 5,687,322 A | 11/1997 | Deaton et al. |
| 5,692,132 A | 11/1997 | Hogan |
| 5,698,837 A | 12/1997 | Furuta |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,249 A | 3/1998 | Pollin |
| 5,748,780 A | 5/1998 | Stolfo |
| 5,751,842 A | 5/1998 | Eccles |
| 5,757,917 A | 5/1998 | Rose et al. |
| 5,770,843 A | 6/1998 | Rose et al. |
| 5,774,553 A | 6/1998 | Rosen |
| 5,783,808 A | 7/1998 | Josephson |
| 5,784,696 A | 7/1998 | Melnikof |
| 5,787,403 A | 7/1998 | Randle |
| 5,789,732 A | 8/1998 | McMahon et al. |
| 5,793,861 A | 8/1998 | Haigh |
| 5,794,221 A | 8/1998 | Egendorf |
| 5,796,827 A | 8/1998 | Coppersmith et al. |
| 5,802,498 A | 9/1998 | Comesanas |
| 5,802,499 A | 9/1998 | Sampson et al. |
| 5,819,238 A | 10/1998 | Fernholz |
| 5,826,241 A | 10/1998 | Stein |
| 5,826,245 A | 10/1998 | Sandberg-Diment |
| 5,832,090 A | 11/1998 | Raspotnik |
| 5,832,447 A | 11/1998 | Rieker et al. |
| 5,832,457 A | 11/1998 | O'Brien et al. |
| 5,832,460 A | 11/1998 | Bednar |
| 5,832,463 A | 11/1998 | Houvener et al. |
| 5,832,464 A | 11/1998 | Houvener et al. |
| 5,832,488 A | 11/1998 | Eberhardt |
| 5,835,580 A | 11/1998 | Fraser |

| Patent No. | Date | Inventor |
|---|---|---|
| 5,835,603 A | 11/1998 | Coutts |
| 5,835,899 A | 11/1998 | Rose et al. |
| 5,852,811 A | 12/1998 | Atkins |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,723 A | 2/1999 | Pare |
| 5,870,725 A | 2/1999 | Bellinger et al. |
| 5,873,072 A | 2/1999 | Kight |
| 5,878,141 A | 3/1999 | Daly et al. |
| 5,883,377 A | 3/1999 | Chapin, Jr. |
| 5,884,288 A | 3/1999 | Chang |
| 5,884,290 A | 3/1999 | Smorodinsky et al. |
| 5,897,625 A | 4/1999 | Gustin |
| 5,898,157 A | 4/1999 | Mangili et al. |
| 5,903,881 A | 5/1999 | Schrader |
| 5,907,142 A | 5/1999 | Kelsey |
| 5,910,896 A | 6/1999 | Hahn-Carlson |
| 5,910,988 A | 6/1999 | Ballard |
| 5,915,246 A | 6/1999 | Patterson et al. |
| 5,917,965 A | 6/1999 | Cahill et al. |
| 5,920,847 A | 7/1999 | Kolling et al. |
| 5,930,778 A | 7/1999 | Geer |
| 5,940,811 A | 8/1999 | Norris |
| 5,940,844 A | 8/1999 | Cahill et al. |
| 5,943,656 A | 8/1999 | Crooks |
| 5,945,653 A | 8/1999 | Walker et al. |
| 5,949,044 A | 9/1999 | Walker et al. |
| 5,950,174 A | 9/1999 | Brendzel |
| 5,956,700 A | 9/1999 | Landry |
| 5,960,411 A | 9/1999 | Hartman et al. |
| 5,963,659 A | 10/1999 | Cahill et al. |
| 5,963,925 A | 10/1999 | Kolling et al. |
| 5,966,698 A | 10/1999 | Pollin |
| 5,970,475 A | 10/1999 | Barnes et al. |
| 5,978,780 A | 11/1999 | Watson |
| 5,987,434 A | 11/1999 | Libman |
| 5,987,435 A | 11/1999 | Weiss et al. |
| 5,987,436 A | 11/1999 | Halbrook |
| 5,987,439 A | 11/1999 | Gustin |
| 5,991,749 A | 11/1999 | Morrill, Jr. |
| 5,991,750 A | 11/1999 | Craig |
| 6,000,832 A | 12/1999 | Franklin et al. |
| 6,002,767 A | 12/1999 | Kramer |
| 6,003,762 A | 12/1999 | Hayashida |
| 6,006,205 A | 12/1999 | Loeb et al. |
| 6,006,208 A | 12/1999 | Forst et al. |
| 6,009,442 A | 12/1999 | Chen et al. |
| 6,014,636 A | 1/2000 | Reeder |
| 6,016,482 A | 1/2000 | Molinari et al. |
| 6,016,484 A | 1/2000 | Williams et al. |
| 6,018,718 A | 1/2000 | Walker et al. |
| 6,026,388 A | 2/2000 | Liddy et al. |
| 6,029,139 A | 2/2000 | Cunningham et al. |
| 6,029,153 A | 2/2000 | Bauchner et al. |
| 6,032,133 A | 2/2000 | Hilt et al. |
| 6,032,134 A | 2/2000 | Weissman |
| 6,032,136 A | 2/2000 | Brake, Jr. et al. |
| 6,032,137 A | 2/2000 | Hallard |
| 6,035,281 A | 3/2000 | Crosskey et al. |
| 6,035,285 A | 3/2000 | Schlect et al. |
| 6,035,287 A | 3/2000 | Stallaert et al. |
| 6,036,099 A | 3/2000 | Leighton |
| 6,038,553 A | 3/2000 | Hyde, Jr. |
| 6,041,312 A | 3/2000 | Bickerton et al. |
| 6,041,315 A | 3/2000 | Pollin |
| 6,044,362 A | 3/2000 | Neely |
| 6,045,039 A | 4/2000 | Stinson et al. |
| 6,047,261 A | 4/2000 | Siefert |
| 6,052,674 A | 4/2000 | Zervides et al. |
| 6,058,380 A | 5/2000 | Anderson et al. |
| 6,058,381 A | 5/2000 | Nelson |
| 6,061,665 A | 5/2000 | Bahreman |
| 6,064,764 A | 5/2000 | Bhaskaran et al. |
| 6,064,987 A | 5/2000 | Walker et al. |
| 6,065,675 A | 5/2000 | Teicher |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,683 A | 7/2000 | Jalili |
| 6,088,685 A | 7/2000 | Kiron et al. |
| 6,088,686 A | 7/2000 | Walker et al. |
| 6,092,056 A | 7/2000 | Tull, Jr. et al. |
| 6,092,057 A | 7/2000 | Zimmerman et al. |
| 6,098,053 A | 8/2000 | Slater |
| 6,098,070 A | 8/2000 | Maxwell |
| 6,101,479 A | 8/2000 | Shaw |
| 6,105,007 A | 8/2000 | Norris |
| 6,105,011 A | 8/2000 | Morrison, Jr. |
| 6,108,639 A | 8/2000 | Walker et al. |
| 6,110,044 A | 8/2000 | Stern |
| 6,111,858 A | 8/2000 | Greaves et al. |
| 6,115,690 A | 9/2000 | Wong |
| 6,119,106 A | 9/2000 | Mersky et al. |
| 6,119,107 A | 9/2000 | Polk |
| 6,125,354 A | 9/2000 | MacFarlane et al. |
| 6,128,599 A | 10/2000 | Walker et al. |
| 6,128,602 A | 10/2000 | Northington et al. |
| 6,128,603 A | 10/2000 | Dent et al. |
| 6,129,273 A | 10/2000 | Shah |
| 6,138,118 A | 10/2000 | Koppstein et al. |
| 6,138,917 A | 10/2000 | Chapin, Jr. |
| 6,141,666 A | 10/2000 | Tobin |
| 6,144,946 A | 11/2000 | Iwamura |
| 6,148,293 A | 11/2000 | King |
| 6,149,055 A | 11/2000 | Gatto |
| 6,149,056 A | 11/2000 | Stinson et al. |
| 6,173,272 B1 | 1/2001 | Thomas et al. |
| 6,181,837 B1 | 1/2001 | Cahill et al. |
| 6,185,542 B1 | 2/2001 | Moran et al. |
| 6,185,544 B1 | 2/2001 | Sakamoto et al. |
| 6,188,309 B1 | 2/2001 | Levine |
| 6,202,054 B1 | 3/2001 | Lawlor et al. |
| 6,205,433 B1 | 3/2001 | Boesch et al. |
| 6,213,391 B1 | 4/2001 | Lewis |
| 6,223,168 B1 | 4/2001 | McGurl et al. |
| 6,227,447 B1 | 5/2001 | Campisano |
| 6,233,565 B1 | 5/2001 | Lewis et al. |
| 6,233,566 B1 | 5/2001 | Leving |
| 6,236,972 B1 | 5/2001 | Shkedy |
| 6,240,444 B1 | 5/2001 | Fin et al. |
| 6,243,689 B1 | 6/2001 | Norton |
| 6,267,292 B1 | 7/2001 | Walker et al. |
| 6,278,981 B1 | 8/2001 | Dembo et al. |
| 6,289,322 B1 | 9/2001 | Kitchen et al. |
| 6,292,789 B1 | 9/2001 | Schutzer |
| 6,301,379 B1 | 10/2001 | Thompson et al. |
| 6,301,567 B1 | 10/2001 | Leong et al. |
| 6,304,858 B1 | 10/2001 | Mosler et al. |
| 6,305,603 B1 | 10/2001 | Grunbok, Jr. et al. |
| 6,308,887 B1 | 10/2001 | Korman et al. |
| 6,321,212 B1 | 11/2001 | Lange |
| 6,324,524 B1 | 11/2001 | Lent et al. |
| 6,327,575 B1 | 12/2001 | Katz |
| 6,338,047 B1 | 1/2002 | Wallman |
| 6,338,049 B1 | 1/2002 | Walker et al. |
| 6,341,724 B2 | 1/2002 | Campisano |
| 6,343,279 B1 | 1/2002 | Bissonette et al. |
| 6,349,290 B1 | 2/2002 | Horowitz et al. |
| 6,363,164 B1 | 3/2002 | Jones et al. |
| 6,363,364 B1 | 3/2002 | Nel |
| 6,363,365 B1 | 3/2002 | Kou |
| 6,366,967 B1 | 4/2002 | Wagner |
| 6,374,235 B1 | 4/2002 | Chen et al. |
| 6,390,362 B1 | 5/2002 | Martin |
| 6,393,409 B2 | 5/2002 | Young et al. |
| 6,405,173 B1 | 6/2002 | Honarvar et al. |
| 6,405,181 B2 | 6/2002 | Lent et al. |
| 6,415,259 B1 | 7/2002 | Wolfinger et al. |
| 6,418,419 B1 | 7/2002 | Nieboer et al. |

| | | |
|---|---|---|
| 6,418,420 B1 | 7/2002 | DiGiorgio et al. |
| 6,418,430 B1 | 7/2002 | DeFazio et al. |
| 6,424,949 B1 | 7/2002 | Deaton et al. |
| 6,434,159 B1 | 8/2002 | Woodward et al. |
| 6,446,072 B1 | 9/2002 | Schulze et al. |
| 6,460,020 B1 | 10/2002 | Pool et al. |
| 6,485,922 B1 | 11/2002 | Erickson et al. |
| 6,490,568 B1 | 12/2002 | Omara et al. |
| 6,493,685 B1 * | 12/2002 | Ensel et al. ............... 705/40 |
| 6,513,019 B2 | 1/2003 | Lewis |
| 6,535,896 B2 | 3/2003 | Britton et al. |
| 6,536,663 B1 | 3/2003 | Lozier et al. |
| 6,554,185 B1 | 4/2003 | Montross et al. |
| 6,560,581 B1 | 5/2003 | Fox et al. |
| 6,567,791 B2 | 5/2003 | Lent et al. |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,607,127 B2 | 8/2003 | Wong |
| 6,609,113 B1 | 8/2003 | O'Leary et al. |
| 6,609,125 B1 | 8/2003 | Layne et al. |
| 6,629,081 B1 | 9/2003 | Cornelius et al. |
| 6,636,615 B1 | 10/2003 | Rhoads et al. |
| 6,658,393 B1 | 12/2003 | Basch et al. |
| 6,661,910 B2 | 12/2003 | Jones et al. |
| 6,704,714 B1 | 3/2004 | O'Leary et al. |
| 6,721,715 B2 | 4/2004 | Nemzow |
| 6,728,397 B2 | 4/2004 | McNeal |
| D490,840 S | 6/2004 | Arakaki et al. |
| D491,186 S | 6/2004 | Arakaki et al. |
| D491,953 S | 6/2004 | Arakaki et al. |
| D496,365 S | 9/2004 | Liu et al. |
| D498,236 S | 11/2004 | Liu et al. |
| 6,820,058 B2 | 11/2004 | Wood et al. |
| 6,824,066 B2 | 11/2004 | Weyant |
| 6,825,940 B1 | 11/2004 | Wu et al. |
| 6,860,375 B2 | 3/2005 | Hallowell et al. |
| 6,865,547 B1 | 3/2005 | Brake, Jr. et al. |
| 6,954,896 B1 | 10/2005 | Dodrill et al. |
| 6,965,882 B1 | 11/2005 | Lapstun et al. |
| 6,970,259 B1 | 11/2005 | Lunt et al. |
| 6,970,830 B1 | 11/2005 | Samra et al. |
| 6,970,855 B2 | 11/2005 | Das et al. |
| RE38,957 E | 1/2006 | Laussermair et al. |
| 6,999,943 B1 | 2/2006 | Johnson et al. |
| 7,004,382 B2 | 2/2006 | Sandru |
| 7,025,256 B2 | 4/2006 | Drummond et al. |
| 7,062,456 B1 | 6/2006 | Riehl et al. |
| 7,068,832 B1 | 6/2006 | Price et al. |
| 7,070,095 B1 | 7/2006 | Gandel et al. |
| 7,104,443 B1 | 9/2006 | Paul et al. |
| 7,133,846 B1 | 11/2006 | Ginter et al. |
| 7,177,836 B1 | 2/2007 | German et al. |
| 7,194,437 B1 | 3/2007 | Britto et al. |
| 7,200,255 B2 | 4/2007 | Jones et al. |
| 7,228,155 B2 | 6/2007 | Saunders |
| 7,249,112 B2 | 7/2007 | Berardi et al. |
| 7,312,707 B1 | 12/2007 | Bishop et al. |
| 7,313,543 B1 | 12/2007 | Crane et al. |
| 7,317,823 B1 | 1/2008 | Price et al. |
| 7,337,148 B2 | 2/2008 | Xie et al. |
| 7,349,884 B1 | 3/2008 | Odom et al. |
| RE40,220 E | 4/2008 | Nichols et al. |
| 7,380,707 B1 | 6/2008 | Fredman |
| 7,401,048 B2 | 7/2008 | Rosedale et al. |
| 7,493,288 B2 | 2/2009 | Biship et al. |
| 7,546,272 B2 | 6/2009 | Loy |
| 7,587,363 B2 | 9/2009 | Cataline et al. |
| 2001/0011222 A1 | 8/2001 | McLauchlin et al. |
| 2001/0018666 A1 | 8/2001 | Sugiyama et al. |
| 2001/0018739 A1 | 8/2001 | Anderson et al. |
| 2001/0027441 A1 | 10/2001 | Wankmueller |
| 2001/0032139 A1 | 10/2001 | Debonnet, Jr. |
| 2001/0034663 A1 | 10/2001 | Teveler et al. |
| 2001/0037300 A1 | 11/2001 | Miyazaki et al. |
| 2001/0037309 A1 | 11/2001 | Carlyle |
| 2001/0038033 A1 | 11/2001 | Habib |
| 2001/0047334 A1 | 11/2001 | Nappe et al. |
| 2001/0047489 A1 | 11/2001 | Ito et al. |
| 2001/0051533 A1 | 12/2001 | Wietzke et al. |
| 2002/0012445 A1 | 1/2002 | Perry |
| 2002/0013728 A1 | 1/2002 | Wilkman |
| 2002/0023055 A1 | 2/2002 | Antognini et al. |
| 2002/0026394 A1 | 2/2002 | Savage et al. |
| 2002/0032651 A1 | 3/2002 | Embrey |
| 2002/0038363 A1 | 3/2002 | MacLean |
| 2002/0046169 A1 | 4/2002 | Keresman, III et al. |
| 2002/0047316 A1 | 4/2002 | Chitayat |
| 2002/0052842 A1 | 5/2002 | Schuba et al. |
| 2002/0055907 A1 | 5/2002 | Pater et al. |
| 2002/0069134 A1 | 6/2002 | Solomon |
| 2002/0072976 A1 | 6/2002 | Virtanen et al. |
| 2002/0077978 A1 | 6/2002 | O'Leary et al. |
| 2002/0082985 A1 | 6/2002 | MacKay |
| 2002/0084321 A1 | 7/2002 | Martens et al. |
| 2002/0087415 A1 | 7/2002 | Allen et al. |
| 2002/0087468 A1 | 7/2002 | Ganesan et al. |
| 2002/0087469 A1 | 7/2002 | Ganesan et al. |
| 2002/0091635 A1 | 7/2002 | Dilip et al. |
| 2002/0100803 A1 | 8/2002 | Sehr |
| 2002/0107770 A1 | 8/2002 | Meyer et al. |
| 2002/0107788 A1 | 8/2002 | Cunningham |
| 2002/0111837 A1 | 8/2002 | Aupperle |
| 2002/0128981 A1 | 9/2002 | Kawan et al. |
| 2002/0138390 A1 | 9/2002 | May |
| 2002/0138398 A1 | 9/2002 | Kalin et al. |
| 2002/0156723 A1 | 10/2002 | Lilly et al. |
| 2002/0169658 A1 | 11/2002 | Adler |
| 2002/0170966 A1 | 11/2002 | Hannigan et al. |
| 2002/0178071 A1 | 11/2002 | Walker et al. |
| 2002/0184151 A1 | 12/2002 | Maloney |
| 2002/0194081 A1 | 12/2002 | Perkowski |
| 2002/0194096 A1 | 12/2002 | Falcone et al. |
| 2002/0198817 A1 | 12/2002 | Dhir |
| 2002/0199182 A1 | 12/2002 | Whitehead |
| 2003/0018557 A1 | 1/2003 | Gilbert et al. |
| 2003/0018567 A1 | 1/2003 | Flitcroft et al. |
| 2003/0028481 A1 | 2/2003 | Flitcroft et al. |
| 2003/0037002 A1 | 2/2003 | Higgins et al. |
| 2003/0040959 A1 | 2/2003 | Calvin et al. |
| 2003/0046218 A1 | 3/2003 | Albanese et al. |
| 2003/0055675 A1 | 3/2003 | Klein |
| 2003/0069780 A1 | 4/2003 | Hailwood et al. |
| 2003/0097335 A1 | 5/2003 | Muskowitz et al. |
| 2003/0100803 A1 | 5/2003 | Lu et al. |
| 2003/0105641 A1 | 6/2003 | Lewis |
| 2003/0110070 A1 | 6/2003 | De Goeij |
| 2003/0110136 A1 | 6/2003 | Wells et al. |
| 2003/0110442 A1 | 6/2003 | Battle |
| 2003/0120686 A1 | 6/2003 | Kim et al. |
| 2003/0130945 A1 | 7/2003 | Force et al. |
| 2003/0130952 A1 | 7/2003 | Bell et al. |
| 2003/0144942 A1 | 7/2003 | Sobek |
| 2003/0187787 A1 | 10/2003 | Freund |
| 2003/0187789 A1 | 10/2003 | Karas et al. |
| 2003/0191710 A1 | 10/2003 | Green et al. |
| 2003/0200107 A1 | 10/2003 | Allen et al. |
| 2003/0208421 A1 | 11/2003 | Vicknair et al. |
| 2003/0208441 A1 | 11/2003 | Poplawski et al. |
| 2003/0218066 A1 | 11/2003 | Fernandes et al. |
| 2003/0225663 A1 | 12/2003 | Horan et al. |
| 2003/0233305 A1 | 12/2003 | Solomon |
| 2003/0237046 A1 | 12/2003 | Parker et al. |
| 2004/0010465 A1 | 1/2004 | Michalski et al. |
| 2004/0019605 A1 | 1/2004 | Keown et al. |
| 2004/0029569 A1 | 2/2004 | Khan et al. |
| 2004/0049451 A1 | 3/2004 | Berardi |
| 2004/0049456 A1 | 3/2004 | Dreyer |
| 2004/0064409 A1 | 4/2004 | Kight et al. |
| 2004/0078328 A1 | 4/2004 | Talbert et al. |
| 2004/0094624 A1 | 5/2004 | Fernandes et al. |
| 2004/0133516 A1 | 7/2004 | Buchanan et al. |
| 2004/0149544 A1 | 8/2004 | Dal Ferro |
| 2004/0159700 A1 | 8/2004 | Khan et al. |
| 2004/0201735 A1 | 10/2004 | Baron |
| 2004/0210498 A1 | 10/2004 | Freund |
| 2004/0228514 A1 | 11/2004 | Houle et al. |

| | | | |
|---|---|---|---|
| 2004/0232223 | A1 | 11/2004 | Beenau et al. |
| 2004/0236688 | A1 | 11/2004 | Bozeman |
| 2004/0239481 | A1 | 12/2004 | Beenau |
| 2004/0252012 | A1 | 12/2004 | Beenau et al. |
| 2004/0254837 | A1 | 12/2004 | Roshkoff |
| 2004/0260607 | A1 | 12/2004 | Robbins et al. |
| 2005/0021466 | A1 | 1/2005 | Buchanan et al. |
| 2005/0033619 | A1 | 2/2005 | Barnes et al. |
| 2005/0033690 | A1 | 2/2005 | Antognini et al. |
| 2005/0035847 | A1 | 2/2005 | Bonalle et al. |
| 2005/0040242 | A1 | 2/2005 | Beenau et al. |
| 2005/0055254 | A1 | 3/2005 | Schmidtberg et al. |
| 2005/0077349 | A1 | 4/2005 | Bonalle et al. |
| 2005/0086178 | A1 | 4/2005 | Xie et al. |
| 2005/0091156 | A1 | 4/2005 | Hailwood et al. |
| 2005/0097046 | A1 | 5/2005 | Singfield |
| 2005/0097050 | A1 | 5/2005 | Orcutt |
| 2005/0116024 | A1 | 6/2005 | Beenau et al. |
| 2005/0144059 | A1 | 6/2005 | Schuessler |
| 2005/0171898 | A1 | 8/2005 | Bishop et al. |
| 2005/0177480 | A1 | 8/2005 | Huang |
| 2005/0209954 | A1 | 9/2005 | Asher et al. |
| 2005/0228751 | A1 | 10/2005 | Keown et al. |
| 2005/0261955 | A1 | 11/2005 | Humble et al. |
| 2006/0036553 | A1 | 2/2006 | Gupta et al. |
| 2006/0041540 | A1 | 2/2006 | Shannon et al. |
| 2006/0106650 | A1 | 5/2006 | Bush |
| 2006/0106717 | A1 | 5/2006 | Randle et al. |
| 2006/0136335 | A1 | 6/2006 | Ferguson, III |
| 2006/0161501 | A1 | 7/2006 | Waserstein et al. |
| 2006/0167989 | A1 | 7/2006 | Bashen et al. |
| 2006/0178986 | A1 | 8/2006 | Giordano et al. |
| 2006/0206427 | A1 | 9/2006 | Love et al. |
| 2006/0259390 | A1 | 11/2006 | Rosenberger |
| 2006/0282389 | A1 | 12/2006 | Gupte |
| 2006/0287953 | A1 | 12/2006 | Chauhan |
| 2007/0005498 | A1 | 1/2007 | Cataline et al. |
| 2007/0138255 | A1 | 6/2007 | Carreon et al. |
| 2007/0265924 | A1 | 11/2007 | Shcwarz |
| 2007/0288334 | A1 | 12/2007 | Creedle et al. |
| 2008/0010202 | A1 | 1/2008 | Schwarz |
| 2008/0116283 | A1 | 5/2008 | Newbrough et al. |
| 2008/0193008 | A1 | 8/2008 | Mount et al. |
| 2009/0043651 | A1 | 2/2009 | Schwarz |
| 2010/0299234 | A1* | 11/2010 | Stone et al. ............ 705/30 |

FOREIGN PATENT DOCUMENTS

| | | |
|---|---|---|
| EP | 1014318 | 6/2000 |
| JP | 2001-266039 | 9/2001 |
| JP | 2002-024618 | 1/2002 |
| JP | 2002-056063 | 2/2002 |
| JP | 2002-083241 | 3/2002 |
| JP | 2002-087536 | 3/2002 |
| JP | 2002-508547 | 3/2002 |
| JP | 2002-140505 | 5/2002 |
| JP | 2007-088822 | 4/2007 |
| WO | 91/16691 | 10/1991 |
| WO | 93/08545 | 4/1993 |
| WO | 94/28497 | 12/1994 |
| WO | 96/08783 | 3/1996 |
| WO | 96/12242 | 4/1996 |
| WO | 97/14108 | 4/1997 |
| WO | 97/45796 | 12/1997 |
| WO | 97/45814 | 12/1997 |
| WO | 98/09260 | 3/1998 |
| WO | 99/10823 | 3/1999 |
| WO | 99/49404 | 9/1999 |
| WO | 00/18060 | 3/2000 |
| WO | 00/39979 | 7/2000 |
| WO | 01/75730 | 10/2001 |
| WO | 02/063432 | 8/2002 |
| WO | 2004/079603 | 9/2004 |

OTHER PUBLICATIONS

Andersen Consulting, Image-Based Transaction Processing: The Banking Industry's Challenge for the 1990s and Beyond (1989).

Andrew Gluck, Creating a global cash-management game plan, Bank Systems & Tech., Feb. 1997, at 28.

Andrew Reinbach, Chase steps up treasury system, Bank Systems & Tech., Nov. 1995, at 29.

Angela Maher & Jeffrey Troutman, PNC Bank Treasury Management, Payor's Prescription for Painless Migration to Receipt of Electronic Healthcare Payments and Remittance Advices (Dec. 2001).

Angela Maher & Jeffrey Troutman, PNC Bank Treasury Management, Provider's Prescription for Painless Migration to Receipt of Electronic Healthcare Payments and Remittance Advices (Dec. 2001).

Ann Keeton, Bank of America Completes Its Rollout of 'Paperless' Processing of Payments, Wall St. J., Nov. 1, 1999, at B13.

BancTec Selects Alchemy CD-Based Archival Solution for Remittance Processing System, Bus. Wire, May 6, 1998.

Bank of America Provides Nationwide Lockbox Services, Press Release, Oct. 20, 1999.

Bridget Malone, Internet Billing: Building a Secure Global Market, Electronic Commerce World, Jan. 2001, at 46.

Caere introduces the Model 1800 document remittance processor, Bus. Wire, Oct. 19, 1995.

CardFlash, Daily Payment Card News, Sep. 23, 2004.

CES/NaBanco introduces stored value card technology; Blockbuster Video is first merchant partner, Bus. Wire, Jan. 15, 1996.

Chapter Reports: Texas Chapter, Work Process Improvement Today, Apr. 1998.

Chase Image-Enables Ny Wholesale Lockbox Facility with VICOR Technology, Press Release, Aug. 31, 1999.

Chase Manhattan introduces new FEDI payables product, Cash Mgmt. News, May 1995.

Chase offers image lockbox for Europe, Bank Systems & Tech., Aug. 1997, at 37.

Chasing the Global Trend, Cash Mgmt. News, Dec. 1995, at 8.

Christy Tauhert, Lock Box Solutions Reengineer Payment, Insurance & Tech., Aug. 1996, at 22.

Cindy Jensen, U.S. Bank Effectively Manages Complexity, Today, May/Jun. 2006.

Council for Electronic Billing and Payment, Business-to-Business EIPP: Presentment Models and Payment Options Part One (Jan. 2001).

Council for Electronic Billing and Payment, Business-to-Business EIPP: Presentment Models and Payment Options Part Two (Jan. 2001).

Crestar to Introduce New Advanced Cash Management System Based on IA Corp. Software, Bus. Wire, Oct. 28, 1996.

Dieter Wackerow, MQSeries Enterprise Application Integration Center, MQ Series Primer, Oct. 1999.

DMP and IMR Partner to Develop Electronic Archiving Solution for Wholesale Lockboxes and Remittance Processing, Bus. Wire, Mar. 24, 1998.

Douglas Armstrong, Norwest eases difficulty of interstate banking Bank's customers may use the same account No. at any branch, Milwaukee J. Sentinel, Oct. 12, 1995, at 2.

Du Pont's Electronic Payments System, Corporate EFT Report, Jan. 11, 1989.

Elena Malykhina, Cell Phone Software Formats Check for Online Banking, InformationWeek, Jan. 24, 2008.

Erica Goode, On Profit, Loss and the Mysteries of the Mind, N. Y. Times, Nov. 5, 2002.

Fidelity Helps Fund Sellers Trim the Taxes They'll Owe, Wall St. J., Nov. 7, 2002.

First Data markets stored-value cards, Cards Intl, Jan. 30, 1996, at 5.

Frank J. Derfler, Jr. & Les Freed, How Networks Work 144-51 (2003).

Get ready for electronic commerce, ABA Banking J., Jun. 1995, at 47.

Gordon Platt, Online billing & payments: Technology Providers Multiply, Global Fin., Apr. 1, 2001.

Gregory Zuckerman, the Hedge-Fund Craze, Wall St. J., Jun. 12, 2002.

Henry Urrows & Elizabeth Urrows, Automated imaging in financial services, 11 Document Image Automation 259 (Sep.-Oct 1991).

IA announced installation at QuestPoint of first client/server cash management system with check image storage compatible with IBM, NCR and Unisys, Bus. Wire, May 29, 1997.

IA Corp. Announces New CheckVision Products, Bus. Wire, Apr. 1, 1996.
IA Corp. shows complex transaction processing software WorkVision at AIIM, Bus. Wire, Apr. 14, 1997.
IA Corp. Wins Contract With Comercia to Install the First Digital All Items Archive, Bus. Wire, Jan. 9, 1997.
IA Corporation Becomes a Major Player in Image-Based Cash Management Solutions, Bus. Wire, Nov. 24, 1995.
IA Presents New Advanced Cash Management Software at TMA to Link Banks and Their Corporate Customers, Bus. Wire, Nov. 18, 1996.
Ian McDONALD, The Stars in the Sky Flicker, and Fund Stars Do the Same, Wall St. J., Jan. 15, 2003.
Ia's RemitVision adapted by Harris Bank for CD-ROM and Online Customer Viewing of Check and Remittance Documents, Bus. Wire, May 28, 1996.
In Brief: Wachovia-InteliData Deal, Am. Banker, May 7, 2002.
Initial Launch to 200 Credit Unions, USA Today, Jun. 27, 2002.
Intelidata Technologies Corporation, Form 10-K for fiscal year ended Dec. 31, 2001.
J.D. Carreker, Electronic Check Presentment: Capturing new technology, Banking Mgmt., Mar./Apr. 1995, at 32.
J.P. Buckley et al., Processing noisy structured textual data using a fuzzy matching approach: application to postal address errors, 4 Soft Computing 195 (2000).
Jeetu Patel & Joe Fenner, E-Billing Moves Into B2B, Imaging & Document Solutions, Jan. 2001, at p. 44.
Jeetu Patel, B-to-B E-Billing Heats Up—Business-to-business electronic billing is more complex than the business to-consumer model, but the potential payoffs are bigger, InformationWeek, Oct. 23, 2000.
John C. Bogle, Founder and Former Chairman, The Vanguard Group, Remarks to the '40 Act Institute of Practising Law Institute: Mutual Funds at the Millennium—Fund Directors and Fund Myths (May 15, 2000).
John Shannon, New lockbox platform due out at NationsBank, Bank Systems & Tech., Feb. 1998, at 38.
Jonathan Clements, Harsh Truth: Your Investments Likely Won't Make Any Money, Wall St. J., Nov. 27, 2002.
Keith Lamond, Credit Card Transactions Real World and Online, available at, http://www.virtualschool.edu/mon/ElectronicProperty/klamond/credit_card.htm (last visited Jul. 8, 2005).
Kristen French, Investors Worry CheckFree Being Chased from its Own Game, TheStreet.com, Jun. 20, 2001.
Liz Moyer, Bank of Montreal to Install Imaging System by Unisys for Retail Lockbox Services, Am. Banker, Oct. 22, 1996, at 19.
Liz Moyer, KeyCorp Joins Trend to Check Imaging Lockbox, Am. Banker, Aug. 23, 1996.
M. Williams, FRIIS, Goodbye to paper?, ABA Banking J., Mar. 1989, at 61.
Mark Arend, Bank applications fuel optical storage market, ABA Banking J., Oct. 1991, at 77.
Melinda Norris, First Data Unit Develops Blockbuster Cash Card, Omaha World Herald, Jan. 19, 1996, at 16.
NationsBank rolls out first wholesale lockbox imaging, Potomac, Aug. 3, 1995, at 1.
NCR introduces 7780 item processing system, Bus. Wire, Mar. 11, 1992.
Newsbyte, Visa & Carnegie Mellon Plan Online Payment Scheme, 1995 WL 2205732, Feb. 15, 1995.
Nokia Announces the World's First NFC Enabled Mobile Product for Contactless Payment and Ticketing, PR Newswire, Feb. 9, 2005.
Offer: Book Yourself Free Cassettes, Birmingham Post, Mar. 25, 2000, at 16.
Operating in a multi-currency environment, Aslamoney, Oct. 1995, at 6.
Patricia A. Murphy, E-Billing: New Age Electronic Data; Interchange or Something Better?, Bank Tech. News, Jul. 2000, at 43.
Paul Williams, IBM UK Laboratories Ltd., IBM MQSeries Commercial Messaging, ACM SIGICE Bulletin, Apr. 1995.
Payment Data Systems files patent on debit card payment solution, Am. City Business J., Mar. 5, 2004.
PNC Bank Add Chicago to National Lockbox Network, PR Newswire, Nov. 5, 1997.
Priya Malhotra, Clearing House Enumerates e-Payment Ills, Am Banker, Aug. 13, 2002.
Richard J. Maturi, Personal Finance; When you need to send cash in a flash, N. Y. Times, Sep. 25, 1988, at A7.
Robert M. Hunt, Federal Reserve Bank of Philadelphia, Working Paper No. 03-10: An Introduction to the Economics of Payment Card Networks (Jun. 2003).
Robert M. Hunt, An Introduction to the Economics of Payment Card Networks, Rev. Network Econ., Jun. 2003, at 80.
Scott Leibs, Internet Billing Gets Its Due, CFO, Feb. 1, 2001, at 30.
Shawmut Bank Provides Lockbox Customers Real-Time, On-Line Electronic Exception Processing, Bus. Wire, Jan. 9, 1996.
Sherree DeCovney, Net scope, Banking Tech., May 1997, at 28.
Simultaneous Image Capture, Bank News, Oct. 1996, at 10.
State of Minnesota using AT&T imaging solution to reengineer sales tax paying process, Bus. Wire, Apr. 18, 1994.
Stephen M. Matyas, Digital Signatures—an Overview, 3 Computer Networks 87 (1979).
Steve Bills, Chase Pact Done, What's Next for Web Vendors?, Am. Banker, Jun. 3, 2002, at 23.
Steve Forbes, Fact and Comment, Forbes, Sep. 30, 2002, at 33.
Steven Marjanovic, Corporate Services: Chase Gears Up Global Payments System Series: 16, Am. Banker, Sep. 11, 1995, at 41.
Steven Marjanovic, NationsBank offers lockbox imaging, Am. Banker, Jul. 3, 1995, at 20.
Systems spell change for foreign exchange, Global Investor, Nov. 1996, at 18.
Terrie Miller & Henry Yan, When custody governs, Benefits Canada, Feb. 1998, at 33.
The payments system gets a new image, ABA Banking J., Mar. 1990, at 84.
Thomas P. Fitch, Image Technology brings lockbox breakthroughs, Corp. Cashflow Magazine, Sep. 1995, at 16.
U.S. Appl. No. 60/133,577 (filed May 11, 1999).
Valerie Block, Blockbuster Running Test of a Stored Value Card, Am. Banker, Sep. 1, 1995.
Wausau Financial Systems' ImageRPS and OPEX interface a perfect math, Work Process Improvement Today, Dec. 1997.
Wells Fargo Rolls out Nationwide Lockbox Check Conversion, PR Newswire, Apr. 22, 2003.
Wendy S. Mead, Two Banks' Imaging Deals Target Fee Revenue Increases, Am. Banker, May 9, 1997, at 11.
Wholesale lockbox imaging, ABA Banking J., Feb. 1, 1993.

* cited by examiner

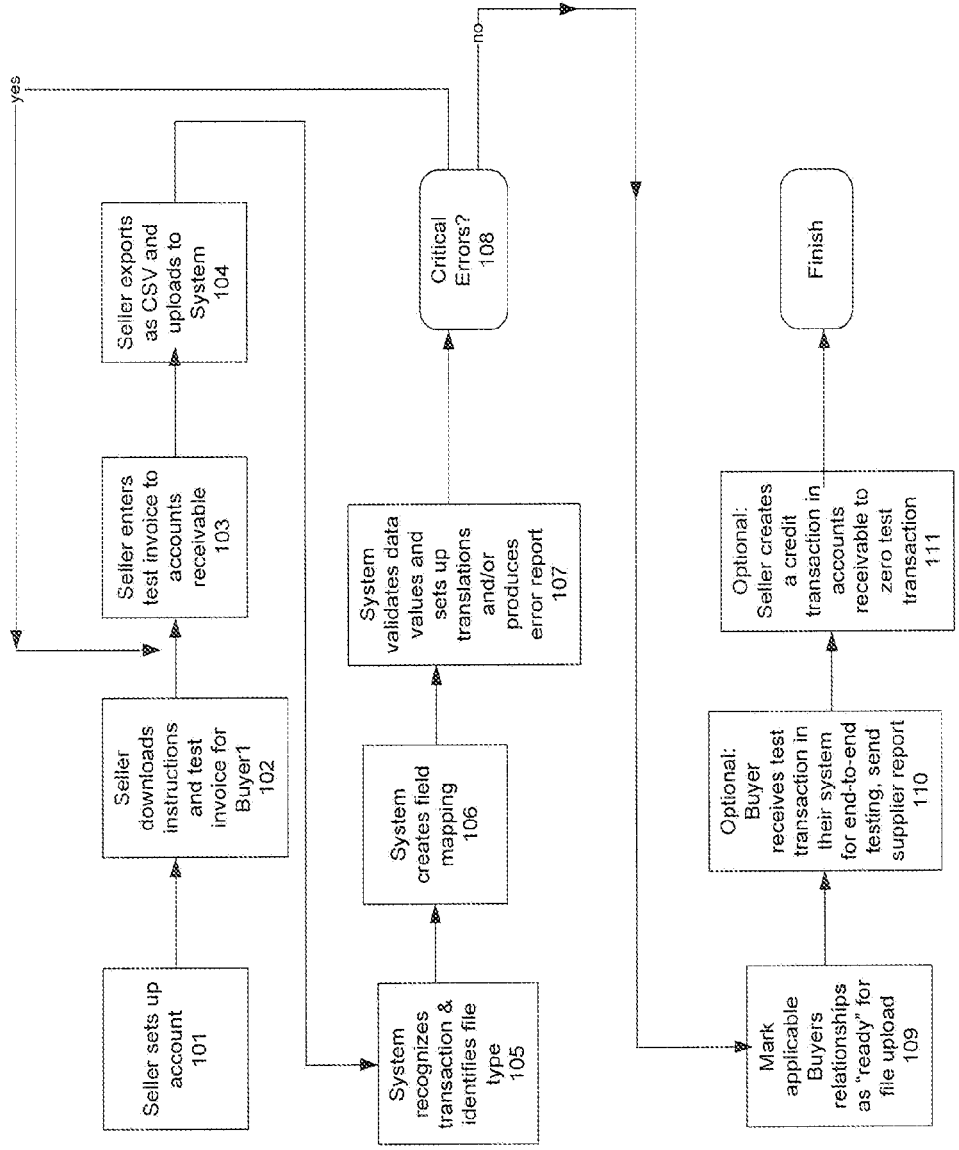

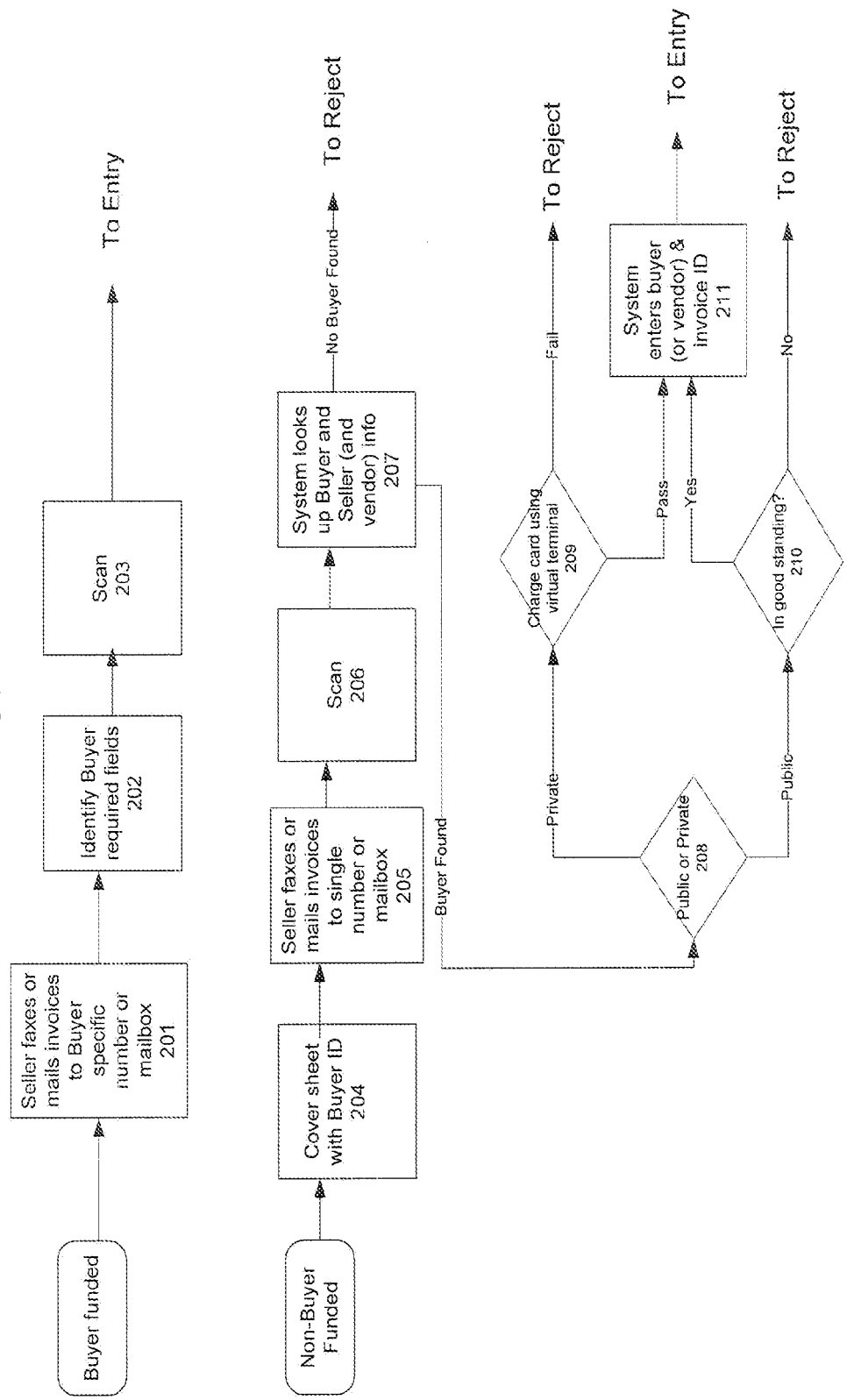

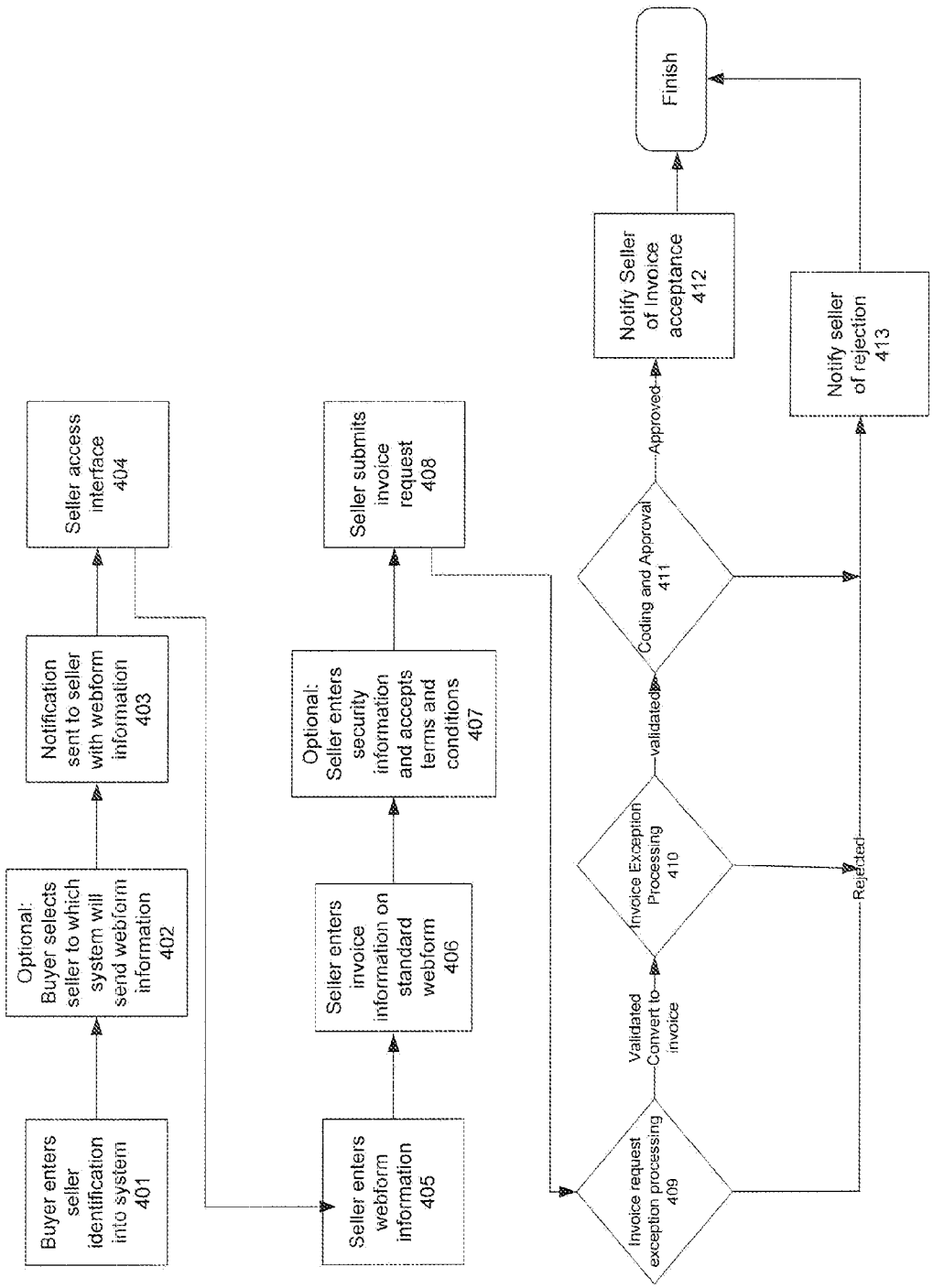

SYSTEMS AND METHODS FOR AUTOMATED INVOICE ENTRY

BACKGROUND OF THE INVENTION

Traditional paper invoicing procedures typically involve the seller sending an invoice to a buyer which lists the purchases that have been made, and the buyer in turn sending the seller payment based on the total amount reflected in the invoice.

In order to avoid the hassle of lost invoices, payment, and to reduce the amount of wasted paper, electronic invoices are becoming more common. Invoices are sent electronically directly to the buyer and the buyer can then remit payment either directly to the seller or through the buyer's bank.

However, there are still drawbacks to conventional electronic invoices. Bulk invoicing, for example, can be particularly time consuming, as each individual invoice must be uploaded into a computer before they are sent to the buyer in bulk. In addition, electronic invoicing often requires manual entry of information by the seller, which can result in lost time, and ultimately, lost money.

There remains a need to streamline the electronic invoicing process in order to increase efficiency and accuracy, saving time and money for both the buyer and the seller.

SUMMARY OF THE INVENTION

The present invention addresses the need in the art by providing efficient invoicing systems and methods for electronic invoicing.

In certain embodiments, the present invention is directed to a computer-implemented method for generating an electronic invoice comprising: receiving a set of invoice field values provided by a user; automatically mapping the invoice field values provided by the user to create mapped data; receiving an image of an invoice of the user; and applying the mapped data fields to the image of the invoice to create an electronic invoice.

In certain embodiment, the present invention is directed to a system for generating an electronic invoice comprising: a processor; a memory; and an application stored in the memory of the system and executable by the processor, wherein the application functions to: receive a set of invoice field values provided by a user; automatically map the invoice field values provided by the user to create mapped data fields; receive an image of an invoice of the user; and apply the mapped data fields to the image of the invoice to create an electronic invoice.

In certain embodiments, the present invention is directed to a computer-readable storage medium storing computer code for implementing a method for generating an electronic invoice, wherein the computer code comprises: code for receiving a set of invoice field values provided by a user; code for automatically mapping the invoice field values provided by the user to Create mapped data fields; code for receiving an image of an invoice of the user; and code for applying the mapped data fields to the image of the invoice to an electronic invoice.

In other embodiments, the present invention is directed to a computer-implemented method for generating batch invoices comprising: receiving a set of invoice field values provided by a user; automatically mapping the invoice field values provided by the user to create mapped data fields; receiving a batch of production invoices comprising individual production invoices of the user; and applying the mapped data fields to the batch of production invoices to create a batch of electronic invoices.

In other embodiments, the present invention is directed to a system for generating batch invoices comprising: a processor; a memory; and an application stored in the memory of the system and executable by the processor, wherein the application functions to: receive a set of invoice field values provided by a user; automatically map the invoice field values provided by the user to create mapped data fields; receive a batch of production invoices comprising individual production invoices from the user; and apply the mapped data fields to the batch of production invoices to create a batch of electronic invoices In other embodiments, the present invention is directed to a computer-readable storage medium storing computer code for implementing a method for generating batch invoices, wherein the computer code comprises: code for receiving a set of invoice field values provided by a user; code for automatically mapping the invoice field values provided by the user to create mapped data fields; code for receiving a batch of production invoices comprising individual production invoices from the user; and code for applying the mapped data fields to the batch of production invoices to create a batch of electronic invoices.

In yet other embodiments, the present invention is directed to a computer-implemented method for invoice exchange comprising: providing a network membership to a buyer-member and seller-members; providing non-network access information to the buyer-member for use with a non-member seller; providing an interface to the non-member seller; receiving the non-network access information from the non-member seller; receiving invoice information for a transaction with the first buyer-member from the non-member seller to create a completed invoice; validating the non-network access information; and providing the completed invoice to the buyer-member In yet other embodiments, the present invention is directed to a system for invoice exchange comprising: a processor; a memory; and an application stored in the memory of the system and executable by the processor, wherein the application functions to: provide a network membership to a buyer-member and seller-members; provide non-network access information to the buyer-member for use with a non-member seller; provide an interface to the non-member seller; receive the non-network access information from the non-member seller; receive invoice information for a transaction with the first buyer-member from the non-member seller to create a completed invoice; validate the non-network access information; and provide the completed invoice to the buyer-member.

In yet other embodiment, the present invention is directed to a computer-readable storage medium storing computer code for invoice exchange, wherein the computer code comprises: code for providing a network membership to a buyer-member and seller-members; code for providing non-network access information to the buyer-member for use with a non-member seller; code for providing an interface to the non-member seller; code for receiving the non-network access information from the non-member seller; code for receiving invoice information for a transaction with the first buyer-member from the non-member seller to create a completed invoice; code for validating the non-network access information; and code for providing the completed invoice to the buyer-member.

BRIEF DESCRIPTION OF THE FIGURES

FIG. 1 depicts a flow chart for preparing a test invoice using the system, according to certain embodiments of the present invention.

FIG. 2 depicts a flow chart for entering invoices into the system, according to an embodiment of the present invention.

FIG. 4 depicts a flow chart of the process for non-member seller invoice entry into the system.

DETAILED DESCRIPTION

Figure 3A:
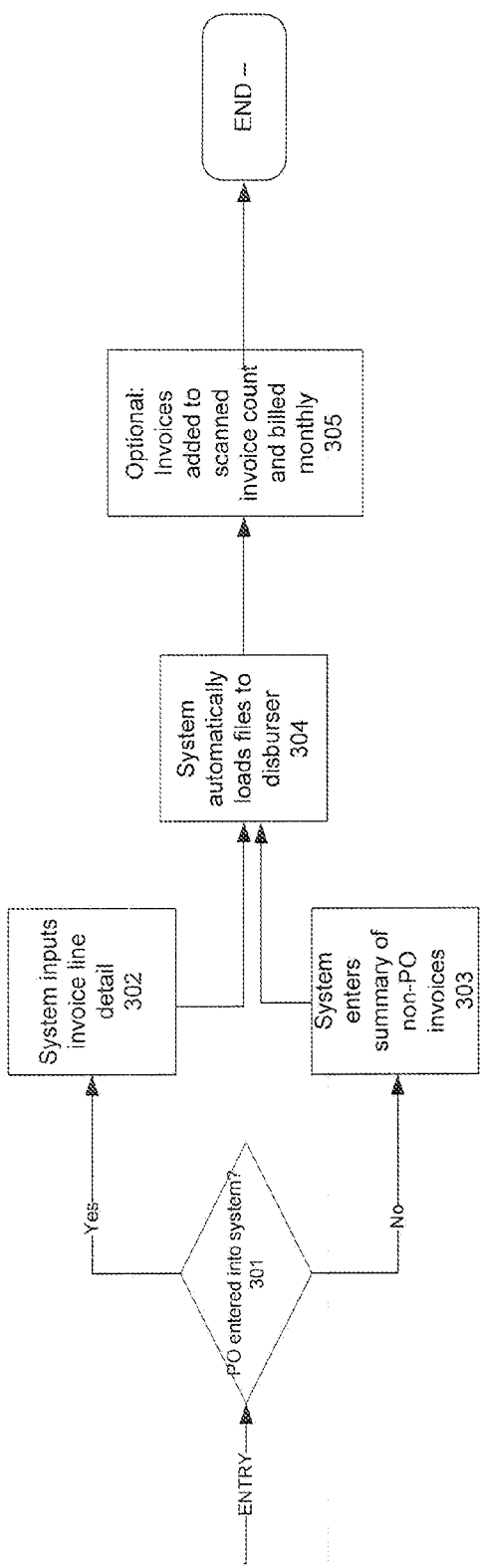
FIG. 3a depicts a flow chart of the entry process of invoices, according to an embodiment of the present invention.

The invoicing systems and methods of the present invention automate the exchange of invoices by integrating buyers and sellers via a secure settlement network, allowing companies to optimize working capital, thereby turning accounts payable processing into a profit center. The invoicing system enhances the user's control over the end-to-end procure-to-pay process. This on-demand technology platform allows companies to achieve effective payables automation, lowering costs and streamlining processes by speeding the migration away from paper and manual processes, reducing data entry and exception management and capturing discounts related to payables spent. Through seamless integration with existing enterprise resource planning and legacy applications, the capability of the invoicing system of the present invention supports invoice tracking and management through an online portal, directly connecting buyers and sellers. Benefits of this aspect of the present invention include, for example, reduced operational costs associated with paper invoice processing, scanning and data entry, increased visibility and control over invoice tracking and history for buyers and sellers, reduced seller inquiry calls by providing all day/all night access to information to sellers, communication of invoice status to all sellers for all invoices, including those submitted through the seller portal, originating from paper, e-file or electronic data interchange (EDI), accommodation of sellers in every industry segment with a suitable invoice options, from paper invoice processing to seller portal access to directed system integration, confirmation to large-seller integration and automated billing requirements, and translation of all invoice data types, including EDI, CVS, XML, AS2 or other electronic documents to buyer-specified formats. Further, as the system is preferably provided by an outside party, responsibility and cost of maintaining the system by the user is removed.

To access the benefits of the system of the present invention, both buyers and sellers enroll as members of the invoicing system which allows them access to the system capabilities. In preferred embodiments, the system not only provides invoicing capabilities, but also automates purchase orders, payments and discounts as well. The system of the present invention allows buyers to expand the maximum number of sellers that receive electronic purchase orders and invoices, therefore also eliminating fax, postage, filing, storage and document administration expenses.

General System Requirements

Various embodiments of the system of the invention and various advantages are described above. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows® 7 operating system, Microsoft Windows® Vista® operating system, the Microsoft Window®XP® operating system, the Microsoft Windows® NT® operating system, the Windows® 2000 operating system, the Unix operating system, the Linux operating system, the Xenix operating system, the IBM AIX® operating system, the Hewlett-Packard UX® operating system, the Novell Netware® operating system, the Sun Microsystems Solaris® operating system, the OS/2® operating system, the BeOS® operating system, the Macintosh operating system, the Apache operating system, an OpenStep® operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, which enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for examine.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

Electronic Invoicing

Using the system of the present invention, sellers are able to export invoice data from their account receivables, billing or other invoicing system and upload that data to be electronically sent through the system network. The system of the present invention provides an automatic configuration feature which walks sellers through the process of mapping an exported invoice file format to the buyer's invoicing fields in order to pre-certify their file format for production electronic invoicing. The system will ask the seller for specific invoice field values as a test invoice which the seller exports and uploads into the system. The system then automatically maps those values to the buyer's required invoice fields.

The automated mapping feature allows a user to convert paper invoices into electronic invoices. The system receives a scanned image of a paper invoice and uses the mapping feature to match the data from the image with the mapped field values, and insert the data into an electronic invoice form. The electronic invoice can then be sent directly to the buyer for reconciliation.

Another advantage of the system of the present invention is that is allows for bulk-upload of invoices. Typically bulk invoicing requires a separate mapping network at the seller's end, which can be very expensive and time consuming. The system of the present invention provides all mapping for the seller to allow for easy upload of multiple invoices.

Referring now to FIG. 1, a seller first sets up an account with the system 101. The seller then downloads instructions and a test invoice from the system for Buyer 1102. The seller will then enter the test invoice into their own accounts receivable system for completion of the appropriate data for the field values 103, exports the completed test invoice as a CSV file and uploads the CSV file to the invoicing system 104. In preferred embodiments, the invoice field values contain a range of tolerances that are acceptable to the seller. The system is programmed to recognize the reference transaction and the file type using recognition logic 105, and creates a mapping field to map the invoice field values using mapping logic 106. The system validates the data entered into by the seller using validation logic 107. If there is an error, the system will notify the seller using notification logic 108. The seller will need to reenter the information into the system, beginning at step 103. In certain embodiments, the system also presents the seller with a manual mapping tool to use for any information which the seller may need to input manually (not shown). If the test invoice has been uploaded accurately, the system will record the status of the invoice for the applicable buyer as "ready" using recordation logic 109. In certain embodiments, Buyer1 will receive a test transaction from the system to further validate the accuracy of the test invoice using testing logic 110. Seller will receive notification from the buyer, either directly or through the system, informing the seller that the test transaction has been completed 110. In certain embodiments, the seller creates a credit transaction to further test the test invoice 111.

Once the test invoice is completed and validated, seller can now begin to upload invoices into the system to convert paper invoices into electronic invoices. Single invoices can be uploaded, or invoices can be bulk-uploaded into the system. Referring now to FIG. 2, preferably, if the buyer is funding the account, then the seller simply faxes or mails the paper invoice to a number or mailbox which is specified for that particular buyer 201. The system then identifies the appropriate buyer fields in the invoice using identification logic 202, the invoice is scanned into the system 203, and then proceeds to invoice entry using routing logic, shown in FIG. 3a. If the seller is funding the account, preferably the seller prepares a coversheet containing buyer identification 204. In certain embodiments, the cover sheet can be pre-printed with buyer information. The seller then faxes or mails the invoice with the coversheet to a single number or mailbox 205. The system scans in the coversheet and the invoice 206 and then checks the databases to determine if the buyer exists in the system using verification logic 207. If the buyer identification is not present in the system, the invoice proceeds to the rejection process using routing logic, shown in FIG. 3b. If the buyer identification is present in the system, the system then determines if the buyer is a public or private company using determination logic 208. Preferably, private companies will have credit cards on file to charge settle the transaction 209. If the initial card transaction fails, the invoice proceeds to the rejection process using routing logic, shown in FIG. 3b. If the initial card transaction passes, the system enters the invoice into the system 211 using routing logic, as shown in FIG. 3a. Similarly for public companies, the system checks to verify the public company is in good standing using verification logic 210. If the public company is in good standing, the invoice gets entered into the system 211 using routing logic, as shown in FIG. 3a. If the public company is not in good standing, the invoice proceeds to rejection using routing logic, as shown in FIG. 3b.

Referring now to FIG. 3a, if the invoice is proceeding to entry, the system verifies if there is an accompanying purchase order (PO) entered into the system using verification logic 301. If there is an accompanying PO, the system will input the invoice line detail into the invoice using matching logic 302, based on the test invoice previously entered. If the invoice field values contain a range of tolerances, the system will verify the data contained in the paper invoices fall within the range of tolerances (not shown). If the data does not fall within the range of tolerances, the system will notify the seller accordingly (not shown). If there is not an accompanying PO, the system will enter a summary of the invoice 303. The system will then automatically load all files to the disburser using loading logic 304, completing the entry process. In preferred embodiments, buyers with multiple invoices will be added collectively and billed monthly 305.

Figure 3B:
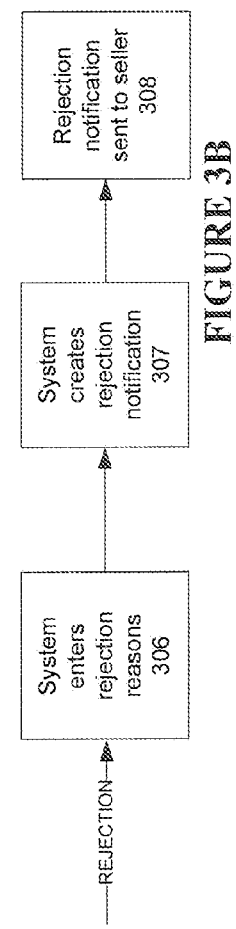
FIG. 3b depicts a flow chart of the rejection process for invoices, according to an embodiment of the present invention.

Referring now to FIG. 3b, if the invoice is rejected, the system enters the reasons for rejection into the system using entry logic 306 and creates a notification 307 using notification logic which is then sent to the seller 308. Rejection notification may be sent, e.g., by e-mail, fax, or mail.

Non-Member Invoice Webforms

In certain embodiments, the present invention also allows buyers to provide select sellers who are not members of the network with the ability to submit invoices through a publicly available interface. Such an embodiment allows non-member sellers to submit invoice information to buyers through standardized web forms without the need to login or sign up for a network account.

In preferred embodiments, the standard webform has entry fields identified by the buyer and seller, a security control tool, and standard terms and conditions for electronic invoicing.

The non-member seller will be provided with information to find the appropriate form to use with the buyer. In order to facilitate the process, the system will store each buyer's unique identification. The non-member seller will then be able to use the buyer's identification to access the appropriate invoice.

Upon initial use, the buyer will verify buyer identification information, such as a unique number or an e-mail address, to ensure that sellers are receiving accurate information. Non-member sellers will also have identifying information stored on the system, such as, for example, a unique number or an e-mail address. The non-member seller identification will be used to link to the buyer's correct vendor, remittance site, and set, if there are multiple ERP's on record.

The buyer will provide all necessary information to the non-member seller, preferably in an e-mail, for logging onto the system and accessing the buyer invoice. Necessary webform information includes, e.g., a link to the interface, such as a URL, the buyer's identifying information (e.g., unique buyer organization system identification, buyer's requester e-mail address, etc.) and the seller's identifying information (e.g., seller's e-mail address, seller's remittance address, captcha code verification, etc.). Non-member seller invoice entry is typically initiated with a message from the buyer providing the non-member seller with the information the non-member seller will need to create an invoice. Once the non-member seller navigates to the public interface, an invoice webform will be presented. The non-member seller will be directed to complete the form appropriately. After completion of the webform, the system will verify if the identifying information for both the buyer and the seller is valid.

Once all information is validated, the buyer will then need to approve the invoice. The buyer will receive notification from the system that an invoice has been submitted by a seller. Invoices will be stored in the system and accessible to the buyer. The buyer can search for invoices though the system, based on their unique permissions. The buyer can then add additional information if needed, save for later submission, approve or reject the invoice.

Referring now to FIG. 4, the buyer will first enter the non-member seller identification into the system 401. When the buyer has entered multiple non-member sellers into the system, the buyer has the option to select the specific non-member seller who will receive the webform information 402. A notification is then sent to the seller regarding their entry into the system using notification logic 403. The notification will contain the necessary information required to access the buyer's webform, which includes a URL, hyperlink or web address to the public interface. Either the system or the buyer can send the notification to the non-member. The non-member seller will then access the interface to obtain the webform 404. The non-member seller enters the requested identifying information into the system 405, along with invoice data directly into the webform 406. For security purposes, the interface may require the seller to provide security information, such as, e.g., a challenge key, numerical identification number (e.g., non-sequential 6-11 digit number), e-mail address of buyer or seller, captcha image, etc. 407. The system may also require that the seller accept the interface terms and conditions 407. Once completed, the seller then sends the invoice request into the system 408. The system determines if the requested identifying information is valid using validation logic 409. If valid, the invoice request is converted to an invoice and proceeds to invoice exception processing using routing logic 410. If the credentials cannot be validated by the system, the system will notify the seller of the rejection using notification logic 413. Once validated, the system then verifies that all information inserted into the webform is in proper format using verification logic 410. If validated, the invoice then moves on for buyer approval using routing logic 411. If the invoice information is not validated, the seller will receive notification from the system of the same using notification logic 413.

Additional System Capabilities

In addition to electronic invoice submission, the system of the present invention can be used in conjunction with existing ERP and legacy applications to create a central seller management system that improves and simplifies seller profile data. In such embodiments, the system additionally provides advanced shipment notification, invoice payment processes, rich remittance data with payments, real time validation and matching, online status tracking, collaborative online dispute resolution, and robust security.

The foregoing description of various embodiments of the invention have been presented for purposes of illustration and description. It is not intended to limit the invention to the precise forms described.

What is claimed:

1. A computer-implemented method for generating batch invoices comprising:
    receiving, at a programmed computer, a set of invoice field values provided by a user;
    automatically mapping, using the programmed computer; the invoice field values provided by the user to create mapped data fields;
    receiving, using the programmed computer, a batch of production invoices comprising individual production invoices of the user, wherein the individual production invoices comprise identification of a buyer;
    verifying, using the programmed computer, the buyer identification;
    determining, using the programmed computer, whether the buyer is a public company or a private company;
    verifying, using the programmed computer, the public company is in good standing upon determining that the buyer is a public company, wherein the batch of production invoices is permitted to be processed upon determining the public company is in good standing;
    verifying, using the programmed computer, the private company has a credit card on file upon determining that the buyer is a private company, wherein the batch of production invoices is permitted to be processed upon determining the private company has a credit card on file; and
    applying, using the programmed computer, the mapped data fields to the batch of production invoices to create a batch of electronic invoices.

2. The computer-implemented method of claim 1, further comprising providing a manual mapping tool.

3. The computer-implemented method of claim 2, wherein the mapping tool is used by the user to manually map at least a portion of the invoice field values.

4. The computer-implemented method of claim 1, further comprising displaying the mapped data on a computer screen of the user.

5. The computer-implemented method of claim 1, further comprising providing the status of the batch of production invoices to the user.

6. The computer-implemented method of claim 1, wherein at least a portion of the invoice field values comprise a range of tolerances for the invoice field values.

7. The computer-implemented method of claim 6, further comprising determining whether data in the batch of production invoices falls within the range of tolerances.

8. The computer-implemented method of claim 7, further comprising notifying the seller when data in the batch of production invoices does not fall within the range of tolerances.

9. The computer-implemented method of claim 1, further comprising providing the batch of completed invoices to a second user.

10. A system for generating batch invoices comprising:
a processor;
a memory; and
an application stored in the memory of the system and executable by the processor, wherein the application functions to:
receive a set of invoice field values provided by a user;
automatically map the invoice field values provided by the user to create mapped data fields;
receive a batch of production invoices comprising individual production invoices from the user, wherein the individual production invoices comprise identification of a buyer;
verify the buyer identification;
determine whether the buyer is a public company or a private company;
verify the public company is in good standing upon determining that the buyer is a public company, wherein the batch of production invoices is permitted to be processed upon determining the public company is in good standing;
verify the private company has a credit card on file upon determining that the buyer is a private company, wherein the batch of production invoices is permitted to be processed upon determining the private company has a credit card on file; and
apply the mapped data fields to the batch of production invoices to create a batch of electronic invoices.

11. The system of claim 10, wherein the application provides a manual mapping tool.

12. The system of claim 11, wherein the mapping tool is used by the user to manually map at least a portion of the invoice field values.

13. The system of claim 10, wherein the application displays the mapped data on a computer screen of the user.

14. The system of claim 10, wherein the application provides the status of the batch of production invoices to the user.

15. The system of claim 10, wherein at least a portion of the invoice field values comprise a range of tolerances for the invoice field values.

16. The system of claim 15, wherein the application determines whether data in the batch of production invoices falls within the range of tolerances.

17. The system of claim 16, wherein the application notifies the user when data in the batch of production invoices does not fall within the range of tolerances.

18. The system of claim 10, wherein the application provides the batch of completed invoices to a second user.

19. A non-transitory computer readable medium having stored thereon a plurality of instructions, the plurality of instructions including instructions that, when executed by a processor, cause the processor to perform the steps of a method for generating batch invoices, the method comprising the steps of:
receiving a set of invoice field values provided by a user;
automatically mapping the invoice field values provided by the user to create mapped data fields;
receiving a batch of production invoices comprising individual production invoices from the user, wherein the individual production invoices comprise identification of a buyer;
verifying the buyer identification;
determining whether the buyer is a public company or a private company;
verifying that the public company is in good standing upon determination that the buyer is a public company, wherein the batch of production invoices is permitted to be processed upon determining the public company is in good standing;
verifying the private company has a credit card on file upon determination that the buyer is a private company, wherein the batch of production invoices is permitted to be processed upon determining the private company has a credit card on file; and
applying the mapped data fields to the batch of production invoices to create the batch of electronic invoices.

20. The non-transitory computer readable medium of claim 19, further comprising providing a manual mapping tool.

* * * * *